Patented July 21, 1942

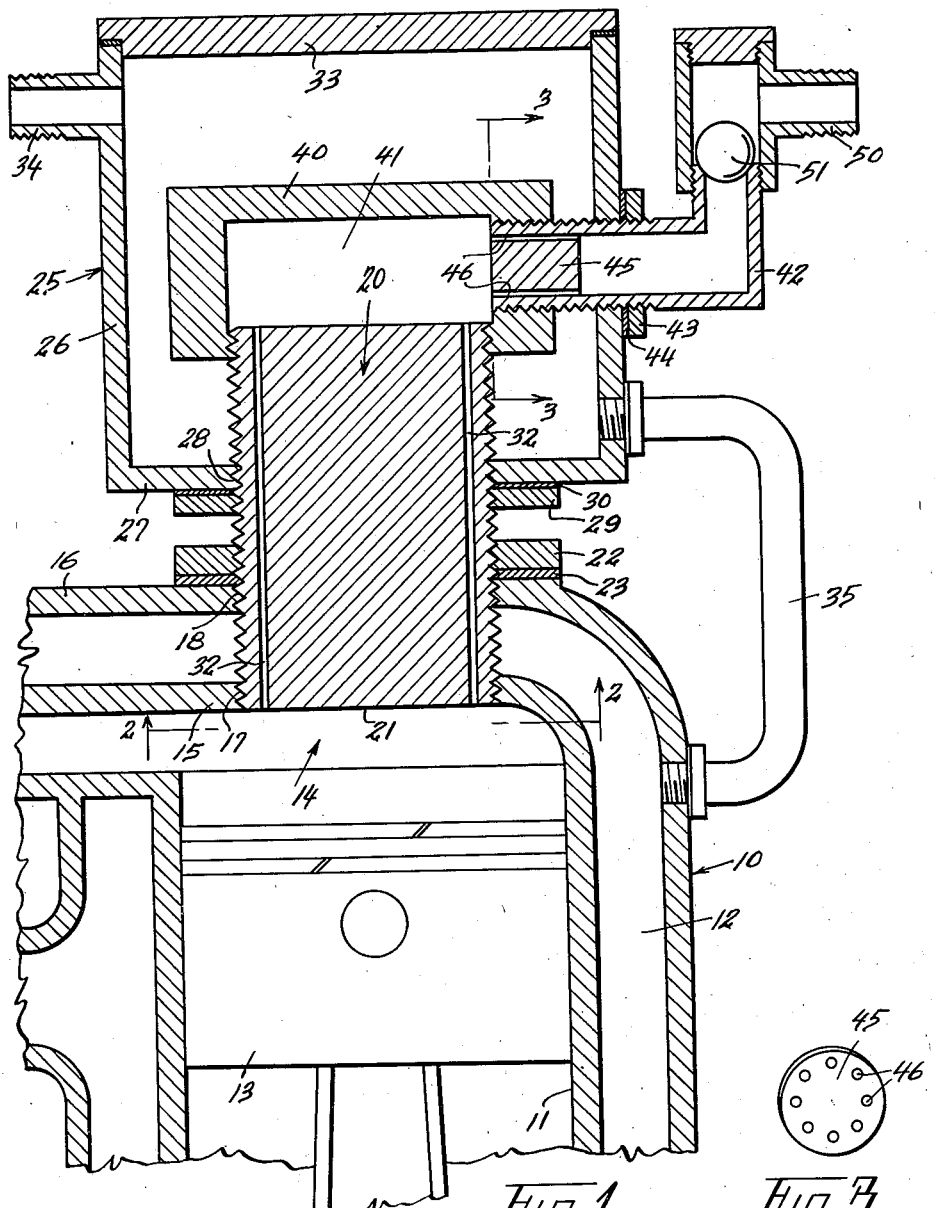

2,290,481

UNITED STATES PATENT OFFICE 2,290,481

FLAME ELIMINATING SYSTEM FROM POWER TAKE-OFF OF COMBUSTION ENGINES

John Moten, Detroit, Mich.

Application April 29, 1940, Serial No. 332,312

1 Claim. (Cl. 123—198)

This invention relates to a flame eliminating system for the combustion chambers of an internal combustion engine.

The object of this invention is to provide for each of the cylinders of an internal combustion engine a device that is operative to separate and destroy the flame of the explosive charge in the combustion chamber of each cylinder and thus prevent the oxidation or burning of the engine valves as well as preventing the formation of carbon deposits in said combustion chambers.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawing, wherein—

Figure 1 illustrates a preferred embodiment of the invention as applied to one of the cylinders of an internal combustion engine.

Figure 2 is a bottom plan view of main plug showing bores therein, as viewed from line 2—2, Figure 1.

Figure 3 is a similar view of secondary plug as viewed from line 3—3, Figure 1.

Referring to the drawing, 10 denotes an engine block having a cylinder 11 surrounded by a conventional water jacket 12. Reciprocating within the cylinder 12 is a piston 13 shown in its uppermost position, the space above the piston defining the combustion chamber 14. The fuel inlet and the exhaust valves for each cylinder have not been shown. The wall 15 opposite the piston 13 is the combustion head and in spaced relation thereto is the outer engine block or water jacket wall 16.

The combustion head 15 and outer jacket wall 16 are provided with threaded registering openings 17 and 18, respectively, arranged co-axial with the piston 13. Threadedly engaging both openings 17 and 18 is a metal plug 20 having flat upper and lower parallel faces, the lower transverse face 21 thereof lying flush with the inside surface of the combustion head 15 as clearly shown, and arranged on the plug 20 is a nut 22 and packing 23 therebeneath for securely clamping said plug to the engine block 10 in the manner readily apparent. The packing 23 acts to prevent leakage of water out of the water jacket.

It will be observed that the diameter of the plug 20 is such that the area of the lower face comprises a substantial major portion of the surface area of the combustion head 15, as clearly shown in Fig. 1.

Mounted on the upper end portion of the plug 20 is a water chamber 25 which is formed to provide a cylindrical wall 26 and an integral bottom wall 27 having formed therein an axial threaded opening 28, threadedly engaging the plug 20. A nut 29 and packing 30 are positioned on the plug exteriorly of the water chamber 25 for securely clamping the plug 20 to the water chamber and for preventing water leakage from out of the water chamber. Preferably the plug 20 is threaded for its entire length so as to permit desired adjustment of the same and the parts carried thereby. Provided in the plug 20 is a circumferential row of equally but closely spaced longitudinally extending bores of passages 32 of relatively small diameter extending completely through said plug and radially spaced from the axis of said plug so as to be as remote therefrom as possible within the radial limits of said plug, for a purpose to be hereinafter described. The upper end of the water chamber 25 is provided with a separable closure cap 33 adapted to be rigidly secured to said water chamber in any desired manner. Provided in the upper end of the water chamber 25 is a nipple 34 adapted to have attached thereto a pipe (not shown) for connecting the water chamber 25 to the engine water pump (not shown). The lower end of the water chamber is connected by a pipe 35 to the water jacket 12 of the engine block 10.

Mounted on the upper end of the plug 20 is a baffle housing 40 providing therewithin a baffle chamber 41 which is in communication with the engine combustion chamber 14 through the medium of the plug bores 32. The baffle housing 40, as shown, is spaced from the inside walls of the water chamber 25 so as to insure complete cooling thereof by the water circulating through the water chamber. A pipe 42 extends through the wall of the water chamber and is threadedly attached at its inner end to the wall of the baffle housing 40. A clamping nut 43 and packing 44 securely clamp the pipe 42 to the water chamber, the packing 44 insuring against leakage of water. The inner end of the pipe 42 is formed to provide a plug 45, and formed in said plug is a like circumferential row of spaced bores 46 which function to communicate the interior of the baffle chamber 41 with the pipe 42. At the exterior end of the pipe 42 there is mounted a valve housing 50 containing a check valve 51 arranged to open outwardly, the valve housing 50 being adapted for connection to a suitable exhaust pipe (not shown).

Upon explosion of the fuel mixture admitted into the combustion chamber 14, the flame thereby produced impinges on the surface 21 of the plug 20 and escapes upwardly through the bores 32 in the baffle chamber 41 where it is diminished and destroyed. The gaseous products of combustion are in turn discharged through the bores 46 in the plug 45 into the pipe 42, unseating the valve 51 to be discharged into the exhaust pipe. The baffle housing 40 is cooled by the water circulating through the water chamber 25.

Having thus described the invention what is claimed is:

A flame destroying device for a cylinder of a water jacketed internal combustion engine comprising a solid cylindrical plug mounted on said engine with its lower end extending through the water jacket and arranged inside of said cylinder, said plug being of a such diameter that its lower end face constitutes a major portion of the surface area of the cylinder head, said plug projecting upwardly from said engine and in coaxial relation to said cylinder, a baffle housing including a baffle chamber detachably fixed to the upper end of said plug, a circumferential row of spaced longitudinally extending bores formed interiorly of said plug and communicating the combustion chamber of said cylinder with said baffle chamber, a water chamber detachably mounted on the upper end of said plug and surrounding all sides of said baffle housing, conduit means connecting the water jacket to said water chamber and discharge conduit means connected to said water chamber for establishing a circulation of water therethrough, a discharge pipe connected to said baffle housing normal to the axis of said plug, a secondary plug in the end of said discharge pipe connected to said baffle housing, a circumferential row of spaced longitudinally extending bores formed in said secondary plug, and an outwardly opening check valve in said discharge pipe connecting the same to an exhaust outlet.

JOHN MOTEN.